United States Patent
Miyahara et al.

(10) Patent No.: US 12,327,291 B2
(45) Date of Patent: Jun. 10, 2025

(54) PROCESSING APPARATUS, PROCESSING METHOD, AND NON-TRANSITORY STORAGE MEDIUM

(71) Applicant: NEC Corporation, Tokyo (JP)

(72) Inventors: Fumiyuki Miyahara, Tokyo (JP); Mai Sato, Tokyo (JP)

(73) Assignee: NEC CORPORATION, Tokyo (JP)

(*) Notice: Subject to any disclaimer, the term of this patent is extended or adjusted under 35 U.S.C. 154(b) by 285 days.

(21) Appl. No.: 17/939,209

(22) Filed: Sep. 7, 2022

(65) Prior Publication Data

US 2023/0089965 A1 Mar. 23, 2023

(30) Foreign Application Priority Data

Sep. 21, 2021 (JP) .................................. 2021-153150

(51) Int. Cl.
*G06Q 50/00* (2024.01)
*G06F 40/279* (2020.01)
*G06Q 50/20* (2012.01)

(52) U.S. Cl.
CPC ......... *G06Q 50/205* (2013.01); *G06F 40/279* (2020.01)

(58) Field of Classification Search
CPC ............................ G06Q 50/205; G06F 40/279
See application file for complete search history.

(56) References Cited

U.S. PATENT DOCUMENTS

2019/0274611 A1* 9/2019 Chavez, Jr. .......... G06Q 50/205

FOREIGN PATENT DOCUMENTS

| JP | 2012-014267 A | 1/2012 |
| JP | 2017-161783 A | 9/2017 |
| JP | 2020-134878 A | 8/2020 |

OTHER PUBLICATIONS

JP Office Action for JP Application No. 2021-153150, mailed on Apr. 22, 2025 with English Translation.
Sho Uwano et al., "Development and Evaluation of a System for Visualizing Bulletin Board Written Contents During Class Using Word Cloud", Proceedings of the 81st National Convention (2019), vol. 4, Information Processing Society of Japan, Feb. 28, 2019, pp. 4-557 to 4-558.

* cited by examiner

*Primary Examiner* — Ibrahim Siddo
(74) *Attorney, Agent, or Firm* — Sughrue Mion, PLLC

(57) ABSTRACT

To provide a new technique for a teacher to recognize a tackling attitude of a student toward class is provided, the present invention provides a processing apparatus 100 including: an input word acquisition unit 101 that acquires an input word being a word input to each of a plurality of student terminals; a classification unit 102 that classifies the input words into a plurality of categories; and a first output unit 103 that displays a list of at least some of the input words, and also outputs, via an output terminal, a screen indicating a result of the classification of each of the input words displayed in the list.

9 Claims, 15 Drawing Sheets

FIG. 2

OUTPUT SCREEN

| RANKING | NG WORD | HIGH FREQUENCY WORD | LOW FREQUENCY WORD | INTERESTING WORD | .... |
|---|---|---|---|---|---|
| FIRST PLACE | GAME | VERTEX | MAH-JONGG | PROJECTION | .... |
| SECOND PLACE | OTHELLO | SIDE | OVERLAP | AI | .... |
| THIRD PLACE | COMIC BOOK | GAME | SHADOW | MIRROR | .... |
| .... | .... | .... | .... | .... | .... |

FIG. 3

OUTPUT SCREEN

| TIME | INPUT WORD | CATEGORY | STUDENT |
|---|---|---|---|
| 7:11:07 | VERTEX | HIGH FREQUENCY WORD | TARO TANAKA |
| 7:11:11 | THREE SIDES | LOW FREQUENCY WORD | HANAKO YAMADA |
| 7:11:12 | OTHELLO | NG WORD | KEN YAMANAKA |
| ⋮ | ⋮ | ⋮ | ⋮ |

FIG. 6

INPUT WORD

| DATE AND TIME | STUDENT IDENTIFICATION INFORMATION | INPUT WORD |
|---|---|---|
| 2021 0830 7:11:07 | M00181 | VERTEX |
| 2021 0830 7:11:11 | W00017 | THREE SIDES |
| 2021 0830 7:11:12 | M00092 | OTHELLO |
| ⋮ | ⋮ | ⋮ |

FIG. 7

CATEGORY DICTIONARY

| NG WORD | INTERESTING WORD | . . . . |
|---|---|---|
| GAME | PROJECTION | |
| COMIC BOOK | OVERLAP | |
| ⋮ | ⋮ | ⋮ |

FIG. 11

(5-1 SECOND TERM, SCIENCE)

| STUDENT IDENTIFICATION INFORMATION | 9/6 | | | | 9/7 | | | ... |
|---|---|---|---|---|---|---|---|---|
| | EVALUATION RESULT | INTERESTING WORD | NG WORD | | EVALUATION RESULT | INTERESTING WORD | NG WORD | |
| M00181 | A | MIRROR, ・・・ | — | | A | MIRROR, SHADOW, ・・× | — | |
| M00182 | E | — | COMIC BOOK, GAME, ・・× | | D | AI, ・・・× | COMIC BOOK, GAME, ・・× | |
| ・・・ | ・・・ | ・・・ | ・・・ | | ・・・ | ・・・ | ・・・ | |

FIG. 15

(5-1. SECOND TERM, SCIENCE)

| STUDENT IDENTIFICATION INFORMATION | 9/6 | | 9/7 | | ..... |
|---|---|---|---|---|---|
| | EVALUATION RESULT | NG OPERATION | EVALUATION RESULT | NG OPERATION | |
| M00181 | A | — | A | — | ....... |
| M00182 | E | USAGE OF UNSPECIFIED CONTENT, ... | E | USAGE OF UNSPECIFIED CONTENT, ... | |
| .... | .... | .... | .... | .... | |

PROCESSING APPARATUS, PROCESSING METHOD, AND NON-TRANSITORY STORAGE MEDIUM

This application is based upon and claims the benefit of priority from Japanese patent application No. 2021-153150, filed on Sep. 21, 2021, the disclosure of which is incorporated herein in its entirety by reference.

TECHNICAL FIELD

The present invention relates to a processing apparatus, a processing method, and a program.

BACKGROUND ART

A technique related to the present invention is disclosed in PTLs 1 and 2.

PTL 1 (Japanese Patent Application Publication No. 2020-134878) discloses a technique that is a learning system using a moving image, and acquires, as a learning log indicating a learning attitude during learning, the number of times of a pause of a moving image, the number of times of a rewind of a moving image, a start point and an end point of a rewind point, the number of times of fast-forward of a moving image, a start point and an end point of a fast-forward point, a velocity adjustment of reproduction velocity, and the like.

PTL 2 (Japanese Patent Application Publication No. 2017-161783) discloses a technique for causing a teacher to recognize behavior of a student by detecting, for each student, behavior history information including another application operated while the student tackles a learning assignment, the number of times the another application is operated, positional information, the number of times the student looks away from an answer screen while the student tackles a learning assignment, and the like, and displaying the detected behavior history information.

DISCLOSURE OF THE INVENTION

A challenge is to provide a new technique for a teacher to recognize a tackling attitude of a student toward class.

The present invention provides a processing apparatus including:
  an input word acquisition unit that acquires an input word being a word input to each of a plurality of student terminals;
  a classification unit that classifies the input words into a plurality of categories; and
  an output unit that displays a list of at least some of the input words, and also outputs, via an output terminal, a screen indicating a result of the classification of each of the input words displayed in the list.

Further, the present invention provides a processing method including,
executed by a computer:
  an input word acquisition step of acquiring an input word being a word input to each of a plurality of student terminals;
  a classification step of classifying the input words into a plurality of categories; and
  an output step of displaying a list of at least some of the input words, and also outputting, via an output terminal, a screen indicating a result of the classification of each of the input words displayed in the list.

Further, the present invention provides a program causing a computer to function as:
  an input word acquisition unit that acquires an input word being a word input to each of a plurality of student terminals;
  a classification unit that classifies the input words into a plurality of categories; and
  an output unit that displays a list of at least some of the input words, and also outputs, via an output terminal, a screen indicating a result of the classification of each of the input words displayed in the list.

The present invention achieves a new technique for a teacher to recognize a tackling attitude of a student toward class.

BRIEF DESCRIPTION OF THE DRAWINGS

FIG. 2 is a diagram schematically illustrating one example of information output from the system according to the present example embodiment.

FIG. 3 is a diagram schematically illustrating one example of information output from the system according to the present example embodiment.

FIG. 6 is a diagram schematically illustrating one example of information processed by the processing apparatus according to the present example embodiment.

FIG. 7 is a diagram schematically illustrating one example of information processed by the processing apparatus according to the present example embodiment.

FIG. 11 is a diagram schematically illustrating one example of information processed by the processing apparatus according to the present example embodiment.

FIG. 15 is a diagram schematically illustrating one example of information processed by the processing apparatus according to the present example embodiment.

DESCRIPTION OF EMBODIMENTS

Hereinafter, example embodiments of the present invention will be described with reference to the drawings. Note

First Example Embodiment

"Overall Perspective and Overview"

Figure 1:
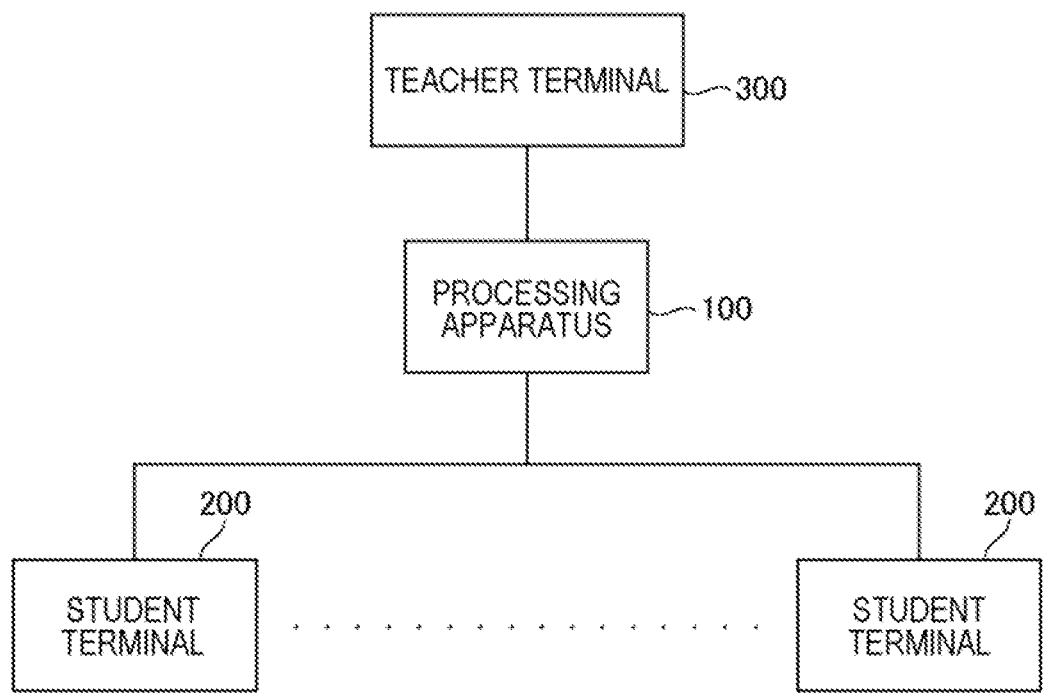
FIG. 1 is a diagram illustrating one example of a functional block diagram of a system according to the present example embodiment.

First, an overall perspective and an overview of a system according to the present example embodiment will be described. As illustrated in FIG. 1, the system according to the present example embodiment is achieved by a processing apparatus 100, a plurality of student terminals 200, and a teacher terminal 300.

The student terminal 200 is a terminal used by a student. The student terminal 200 is used in class, for example. Examples of a usage scene include viewing of a digital textbook and a digital teaching material, learning using a digital collection of questions and the like, management of attendance and grades, communication using a chat function and the like, information collection using a web browser, usage of various applications, and the like, which are not limited thereto.

One student terminal 200 per person is preferable, but one student terminal 200 may be used by M (M is an integer of two or more) persons. A personal computer (PC), a tablet terminal, a smartphone, and the like are exemplified as the student terminal 200, which are not limited thereto.

The teacher terminal 300 is a terminal used by a teacher. The teacher terminal 300 is used in class, for example. Examples of a usage scene include viewing of a digital textbook and a digital teaching material, learning using a digital collection of questions and the like, management of attendance and grades, communication using a chat function, information collection using a web browser, usage of various applications, and the like, which are not limited thereto. A PC, a tablet terminal, a smartphone, an electronic blackboard, and the like are exemplified as the teacher terminal 300, which are not limited thereto.

The processing apparatus 100 acquires an input word being a word input to each of the plurality of student terminals 200, and classifies the input words into a plurality of categories. For example, the categories are an NG word that is not recommended to be input in class, an interesting word recommended to be input in class, a high frequency word having an input frequency equal to or more than a threshold value, a low frequency word having an input frequency less than a threshold value, and the like.

Then, the processing apparatus 100 displays a list of at least some of input words, and also outputs, via an output terminal (for example, the teacher terminal 300), a screen (hereinafter referred to as an "output screen") indicating a result of classification of the input words displayed in the list. FIGS. 2 and 3 illustrate one example of the output screen.

The example illustrated in FIG. 2 displays a list of input words being classified into each category. The example illustrated in FIG. 3 displays an input word in an input order in time series, and also displays a category and a name of a student who performs inputting in association with each input word.

By only simply displaying a list of input words, it is difficult to intuitively recognize a kind of a trend of a word being input. As described above, by classifying input words into a plurality of categories and displaying a list of the input words together with a result of the classification, a kind of a trend of a word being input can be intuitively recognized.

Then, a teacher can recognize a tackling attitude of a student toward class, based on a trend of an input word.

"Configuration of Student Terminal 200 and Teacher Terminal 300"

A configuration of the student terminal 200 and the teacher terminal 300 is not particularly limited. A configuration of various terminals for global and innovation gateway for all (GIGA) schools can be adopted.

Note that, a special characteristic provided in the student terminal 200 and the teacher terminal 300 for achieving an effect (of causing a teacher to recognize a tackling attitude of a student toward class) according to the present example embodiment will be appropriately described in description of a configuration of the processing apparatus 100 below.

"Configuration of Processing Apparatus 100"

Next, the configuration of the processing apparatus 100 will be described in detail.

—Hardware Configuration—

Figure 4:
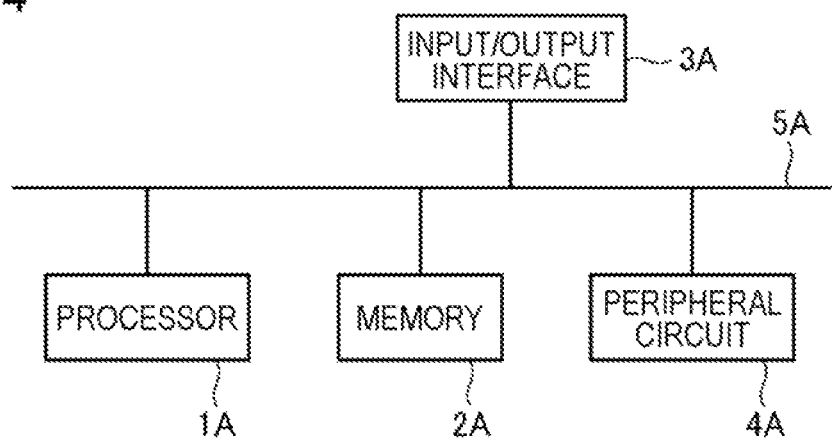
FIG. 4 is a diagram illustrating one example of a hardware configuration of a processing apparatus according to the present example embodiment.

First, one example of a hardware configuration of the processing apparatus 100 will be described. FIG. 4 is a diagram illustrating a hardware configuration example of the processing apparatus 100. Each functional unit included in the processing apparatus 100 is achieved by any combination of hardware and software concentrating on as a central processing unit (CPU) of any computer, a memory, a program loaded into the memory, a storage unit such as a hard disc that stores the program (that can also store a program downloaded from a storage medium such as a compact disc (CD), a server on the Internet, and the like in addition to a program previously stored at a stage of shipping of an apparatus), and a network connection interface. Then, various modification examples of an achievement method and an apparatus thereof are understood by a person skilled in the art.

As illustrated in FIG. 4, the processing apparatus 100 includes a processor 1A, a memory 2A, an input/output interface 3A, a peripheral circuit 4A, and a bus 5A. Various modules are included in the peripheral circuit 4A. The processing apparatus 100 may not include the peripheral circuit 4A. Note that, the processing apparatus 100 may be formed of a plurality of apparatuses separated physically and/or logically, or may be formed of one apparatus integrated physically and logically. When each apparatus is formed of a plurality of apparatuses separated physically and/or logically, each of the plurality of apparatuses can include the hardware configuration described above.

The bus 5A is a data transmission path for the processor 1A, the memory 2A, the peripheral circuit 4A, and the input/output interface 3A to transmit and receive data to and from one another. The processor 1A is an arithmetic processing apparatus such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, and the like, an interface for outputting information to an output apparatus, an external apparatus, an external server, and the like, and the like. The input apparatus is, for example, a keyboard, a mouse, a microphone, and the like. The output apparatus is, for example, a display, a speaker, a printer, a mailer, and the like. The processor 1A can output an instruction to each of modules, and perform an arithmetic operation, based on an arithmetic result of the modules.

—Functional Configuration—

Figure 5:
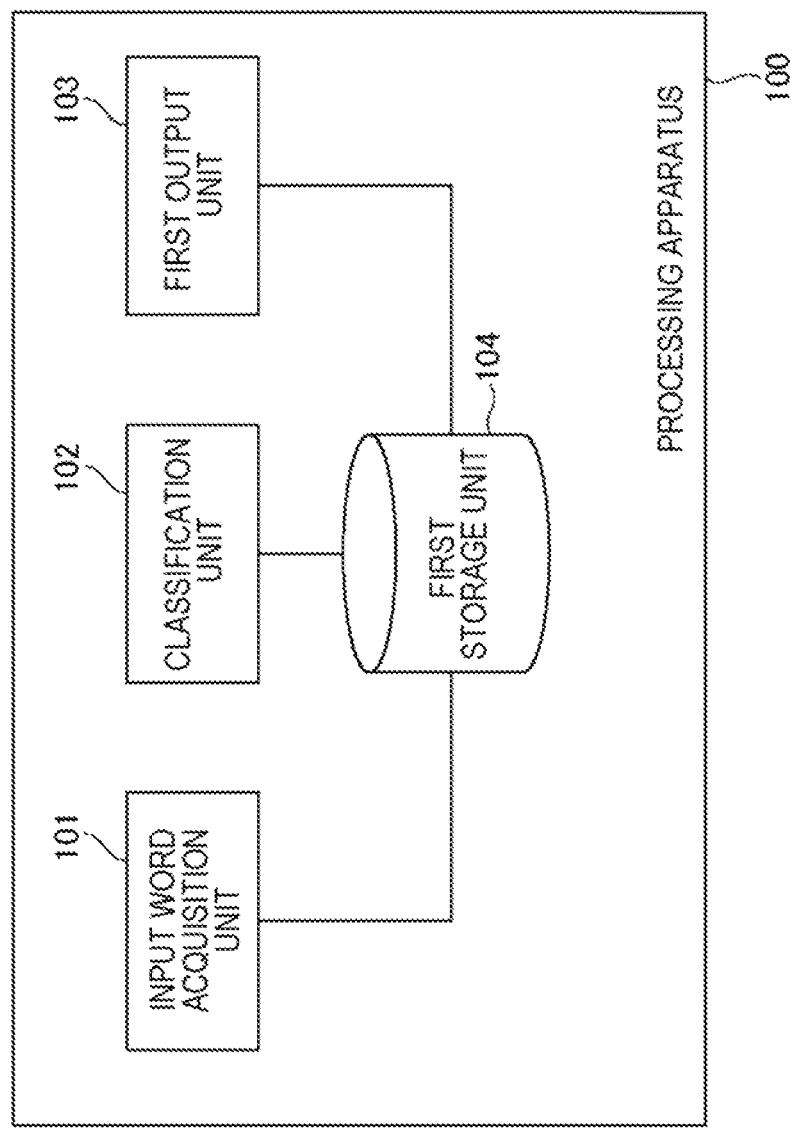
FIG. 5 is a diagram illustrating one example of a functional block diagram of the processing apparatus according to the present example embodiment.

Next, one example of a functional configuration of the processing apparatus 100 will be described. FIG. 5 illustrates one example of a functional block diagram of the processing apparatus 100 according to the present example embodiment. As illustrated, the processing apparatus 100 includes an input word acquisition unit 101, a classification unit 102, a first output unit 103, and a first storage unit 104.

The input word acquisition unit 101 acquires an input word being a word input to each of the plurality of student terminals 200. The student terminal 200 has a function of surveying an input word. Then, the student terminal 200 transmits a detected input word to the processing apparatus 100. The input word acquisition unit 101 acquires an input word transmitted from the student terminal 200 in such a manner.

Note that, the student terminal 200 may have a function of performing parsing on an input character string (such as a sentence and a word), and extracting a word (input word) from the character string. The input word acquisition unit 101 of the processing apparatus 100 may have the word extraction function. In this case, the student terminal 200 transmits an input character string (such as a sentence and a word) to the processing apparatus 100. Then, the input word acquisition unit 101 performs parsing on the character string transmitted from the student terminal 200, and extracts a word (input word).

The input word acquisition unit 101 stores an acquired input word in the first storage unit 104. FIG. 6 schematically illustrates one example of an input word stored in the first storage unit 104. In the illustrated example, an input word, a date and time of input, and student identification information about a student who performs inputting are registered in association with one another. For example, student identification information about a student who inputs each input word can be identified based on log-in information to the student terminal 200, and the like.

The classification unit 102 classifies input words acquired by the input word acquisition unit 101 into a plurality of categories. Then, the classification unit 102 registers a classification result in the first storage unit 104. In the present example embodiment, a kind of a category is not particularly limited. In the example embodiment below, a specific example of a kind of a category will be described.

The classification unit 102 may perform statistical processing on input words, and classify a plurality of input words into a plurality of categories, based on the result. Further, the classification unit 102 may classify input words into a plurality of categories, based on a category dictionary (see FIG. 7) in which a word included in each category is registered in association with each of a plurality of categories. Further, the classification unit 102 may classify an input word into a category by another technique.

The first output unit 103 displays a list of at least some (for example, all) of input words acquired by the input word acquisition unit 101, and also outputs, via an output terminal, an output screen indicating a result of classification of each of the input words displayed in the list. The output terminal is, for example, the teacher terminal 300. Further, the student terminal 200 may be used as the output terminal. FIGS. 2 and 3 illustrate one example of the output screen.

The example illustrated in FIG. 2 displays a list of input words being classified into each category. The example illustrated in FIG. 3 displays an input word in an input order in time series, and also displays a category and a name of a student who performs inputting in association with each input word. Note that, a detailed configuration of the output screen will be described in the following example embodiment.

Figure 8:
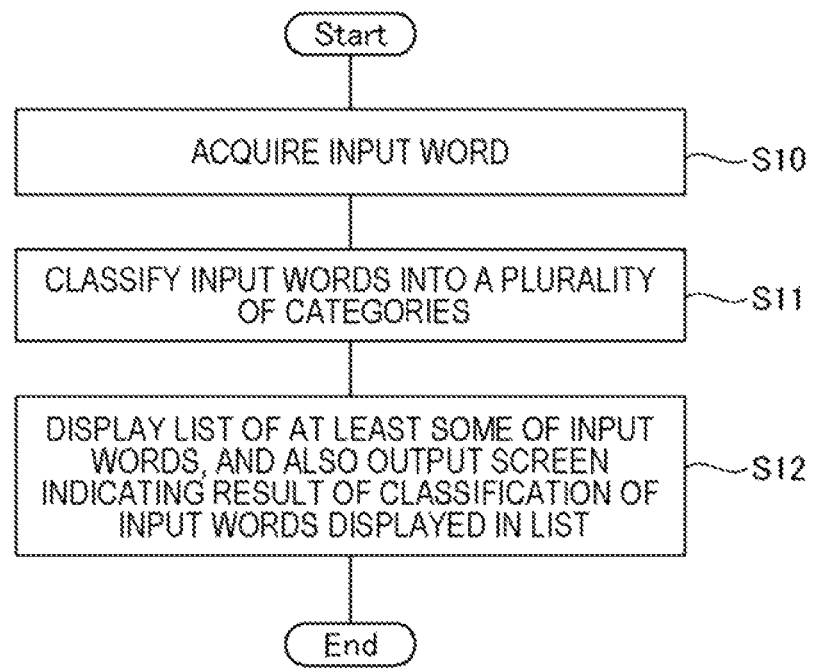
FIG. 8 is a flowchart illustrating one example of a flow of processing of the processing apparatus according to the present example embodiment.

Next, one example of a flow of processing of the processing apparatus 100 will be described by using a flowchart in FIG. 8.

When the processing apparatus 100 acquires an input word being a word input to each of the plurality of student terminals 200 (S10), the processing apparatus 100 classifies the input words into a plurality of categories (S11). Then, the processing apparatus 100 displays a list of at least some of the input words, and also outputs, via an output terminal such as, for example, the teacher terminal 300, an output screen (see FIGS. 2 and 3) indicating a result of classification of each of the input words displayed in the list (S12).

"Advantageous Effect"

The system according to the present example embodiment can display a list of at least some of input words being input to each of the plurality of student terminals 200, and also output, via an output terminal such as, for example, the teacher terminal 300, an output screen (see FIGS. 2 and 3) indicating a result of classification of the input words displayed in the list.

By only simply displaying a list of input words, it is difficult to intuitively recognize a kind of a trend of a word being input. As in the system according to the present example embodiment, by classifying input words into a plurality of categories and displaying a list of the input words together with a result of the classification, a kind of a trend of a word being input can be intuitively recognized. Then, a teacher can recognize a tackling attitude of a student toward class, based on a trend of an input word.

Second Example Embodiment

In the present example embodiment, the configuration of the system according to the first example embodiment is further embodied.

"Embodying of Category"

A category according to the present example embodiment includes at least one of an NG word, an interesting word, a high frequency word, and a low frequency word. Note that, the other category may be further included.

The NG word is a word that is not recommended to be input in class. The NG word may be a word that is not recommended to be input at school (including not only during class but also break time, lunch time, and the like). Which word is set as the NG word is a design matter, but a name of a content that is not recommended to be used in class and at school, such as, for example, "game" and "comic book", and the like may be set as the NG word.

The interesting word is a word recommended to be input in class. The interesting word may be a word recommended to be input at school (including not only during class but also break time, lunch time, and the like). Which word is set as the interesting word is a design matter, but is a word related to class, such as, for example, "projection" and "overlap", and a word based on a unique viewpoint, and the like may be set as the interesting word.

A category dictionary (see FIG. 7) in which a word included in each category is registered in association with each category such as the NG word and the interesting word is prepared in advance. Then, a classification unit 102 classifies input words into a plurality of categories, based on the category dictionary.

Note that, the category dictionary indicating definitions of the NG word and the interesting word may be prepared for each predetermined attribute. The attribute can include at least one of a teacher, a subject, a school, a region, a school year, and a school class. In this case, the classification unit 102 classifies an input word into a category, based on the category dictionary that coincides with an attribute of a class in which the input word is input. The attribute of a class in which an input word is input is a teacher in charge of the class, a subject of the class, a school at which the class is held, a region where a school at which the class is held is located, a school class in which the class is held, a school year of a school class in which the class is held, and the like.

The high frequency word is a word having an input frequency equal to or more than a threshold value in the class. The low frequency word is a word having an input frequency less than a threshold value in the class. The threshold value is a design matter. An input frequency and the threshold value can be represented by the number of input times and the number of persons who perform inputting. The classification unit 102 can compute an input frequency of each input word, based on a history of the input word as illustrated in FIG. 6, for example, and can also classify each input word into the category of the high frequency word or the low frequency word, based on a comparison result between the input frequency and the threshold value.

"Embodying of Output Screen"

Next, an output screen output from a first output unit 103 according to the present example embodiment will be described in detail. FIGS. 2 and 3 illustrate one example of the output screen.

The example illustrated in FIG. 2 displays a list of input words being classified into each category. A plurality of input words included in each category are displayed in descending order of an input frequency or ascending order of an input frequency, for example. In a case of the illustrated example, NG words, high frequency words, and interesting words are displayed in descending order of an input frequency. Then, low frequency words are displayed in ascending order of an input frequency. When display is performed in such a manner, a frequently input word, an infrequently input rare word, and the like can be recognized for each category.

Note that, when the first output unit 103 receives an input for specifying one input word on an input screen thereof, the first output unit 103 may display an input frequency of the specified input word, information (such as a name and student identification information) indicating a student who performs inputting, a time of input, and the like.

The example illustrated in FIG. 3 displays an input word in an input order in time series, and also displays a category and a name of a student who performs inputting in association with each input word. Note that, each category may be color-coded and displayed. For example, a character, a background color, and the like may be color-coded and displayed. In this way, a category of a frequently input word can be intuitively recognized.

"Embodying of Display Timing of Output Screen"

Next, a display timing of an output screen will be described.

Example 1

An input word acquisition unit 101 acquires, during class (between a class start time and a class end time), an input word being input during the class. Then, the first output unit 103 outputs an output screen during the class. In a case of this example, the output screen (see FIGS. 2 and 3) indicating an input word being input from a student is output via an output terminal in real time. A content displayed on the output screen is updated at any time, based on an input word being newly acquired by the input word acquisition unit 101.

Example 2

The input word acquisition unit 101 acquires an input word being input during class (between a class start time and a class end time). The input word acquisition unit 101 may acquire an input word being input during class by real time processing during the class, or may acquire the input word by batch processing after the class ends. In a case of this example, the first output unit 103 outputs, via an output terminal after the class, the output screen (see FIGS. 2 and 3) generated by processing all input words being input from a student during the class in response to a request from a user (teacher), for example. The output screen displayed in the example theoretically has the same content as that of the output screen displayed at a point in time at which the class ends in Example 1.

Example 3

The input word acquisition unit 101 acquires an input word being input between a starting time and an ending time. In other words, an input word being input during not only class but also other time such as break time and lunch time is acquired. The input word acquisition unit 101 may acquire an input word being input between a starting time and an ending time by real time processing, or may acquire the input word by batch processing after the ending time.

In a case of this example, the output screen (see FIGS. 2 and 3) indicating an input word being input from a student may be output via an output terminal in real time similarly to Example 1, or the output screen generated by processing all input words being input from a student during that day may be output via the output terminal after an ending time similarly to Example 2.

The other configuration of a system according to the present example embodiment is similar to that in the first example embodiment.

The system according to the present example embodiment achieves an advantageous effect similar to that in the first example embodiment. Further, the system according to the present example embodiment can classify an input word into a category including at least one of an NG word, an interesting word, a high frequency word, and a low frequency word. A teacher can recognize a tackling attitude of a student toward class, based on an input trend of such a category.

Further, the system according to the present example embodiment can output the output screen (see FIGS. 2 and 3) indicating an input word being input from a student via the output terminal in real time in class. Thus, a teacher can recognize a tackling attitude of a student toward class in real time in the class.

Further, the system according to the present example embodiment can output, via the output terminal after class, the output screen generated by processing all input words being input from a student during the class. Thus, a teacher can recognize a tackling attitude of a student toward class as the whole class, and evaluate a class attitude of each student, and the like.

Further, the system according to the present example embodiment can acquire an input word being input between a starting time and an ending time. In other words, an input word being input during not only class but also other time such as break time and lunch time can be acquired. Thus, a teacher can evaluate not only a tackling attitude toward class, but also a living attitude at school including a way to spend break time, lunch time, and the like, and the like.

Third Example Embodiment

A system according to the present example embodiment is different from the first and second example embodiments in a point that the system according to the present example embodiment has a function of updating the category dictionary described above in response to a user operation.

Figure 9:
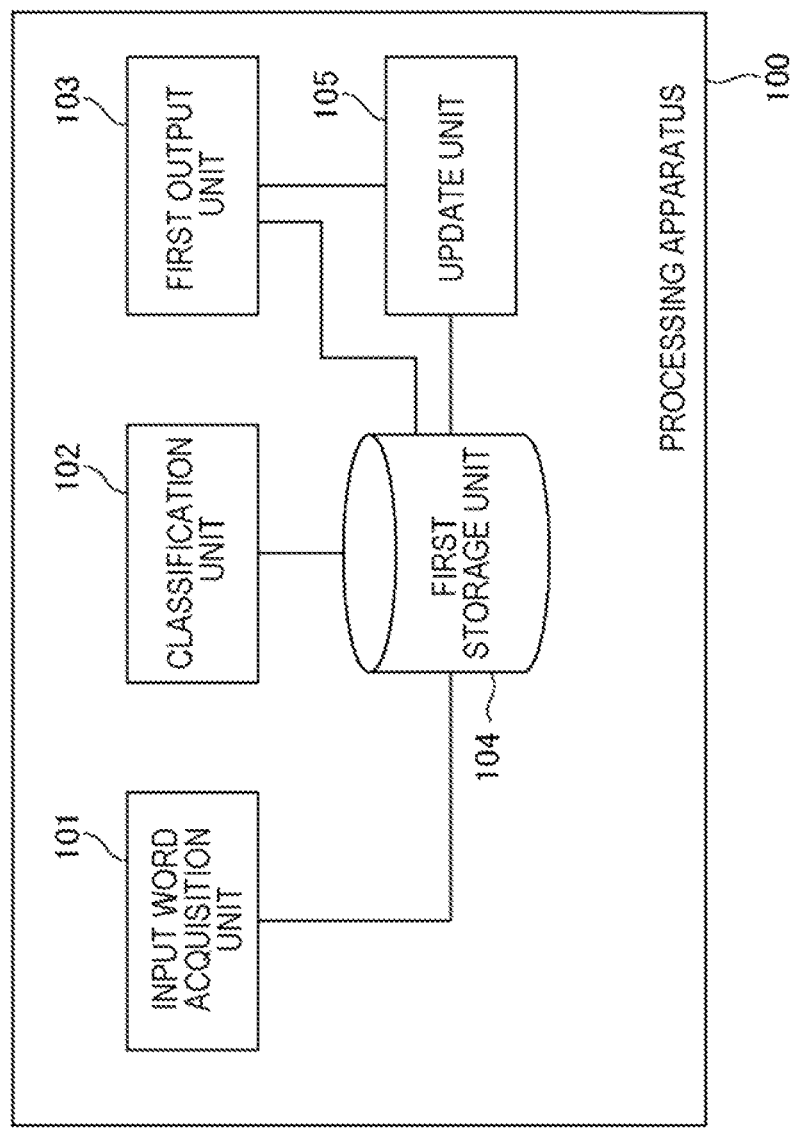
FIG. 9 is a diagram illustrating one example of a functional block diagram of the processing apparatus according to the present example embodiment.

FIG. 9 illustrates one example of a functional block diagram of a processing apparatus 100 according to the present example embodiment. As illustrated, the processing apparatus 100 is different from the first and second example embodiments in a point that the processing apparatus 100 includes an update unit 105.

The update unit 105 updates a category dictionary. When the update unit 105 receives an input for specifying one of input words displayed in a list in a teacher terminal 300 and an input for specifying a category of the specified input word, the update unit 105 registers the specified input word in association with the specified category in the category dictionary.

A technique for displaying input words in a list in the teacher terminal 300 may be display of the output screen as illustrated in FIGS. 2 and 3. In other words, an input for updating a category dictionary may be performed from the output screen illustrated in FIGS. 2 and 3. For example, a teacher can determine, from a high frequency word and a low frequency word on the output screen as illustrated in FIGS. 2 and 3, a word to be newly registered as an NG word or an interesting word, and can perform input for registering the word in the category dictionary described above. When the output screen is displayed in real time in class, a teacher can determine, from a high frequency word and a low frequency word on the output screen in the class, a word to be newly registered as an NG word or an interesting word, and can perform input for registering the word in the category dictionary described above.

The other configuration of the system according to the present example embodiment is similar to that in the first and second example embodiments.

The system according to the present example embodiment achieves an advantageous effect similar to that in the first and second example embodiments. Further, the system according to the present example embodiment can update a category dictionary, based on a user input. Specifically, an input word can be newly registered in the category dictionary. Such a system according to the present example embodiment can register a word being actually input from a student in the category dictionary, and can thus create the category dictionary that further suits an actual condition.

Fourth Example Embodiment

A system according to the present example embodiment is different from the first to third example embodiments in a point that the system according to the present example embodiment has a function of evaluating a class attitude of each student, based on a classification result of an input word of each student.

Figure 10:
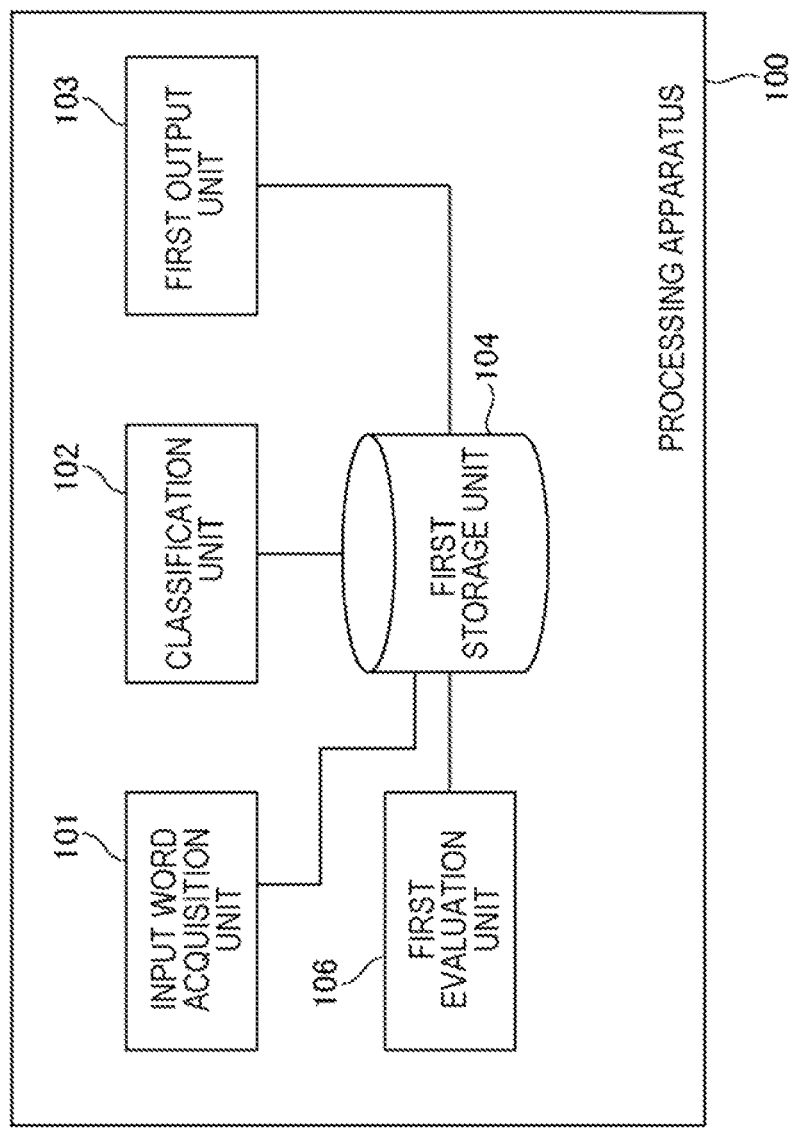
FIG. 10 is a diagram illustrating one example of a functional block diagram of the processing apparatus according to the present example embodiment.

FIG. 10 illustrates one example of a functional block diagram of a processing apparatus 100 according to the present example embodiment. As illustrated, the processing apparatus 100 is different from the first to third example embodiments in a point that the processing apparatus 100 includes a first evaluation unit 106. Note that, although not illustrated, the processing apparatus 100 according to the present example embodiment may include an update unit 105.

The first evaluation unit 106 evaluates a class attitude of each student, based on a classification result of an input word being input from each student. The first evaluation unit 106 can evaluate a class attitude to be higher as an input frequency of a first category is higher (as the number of input times is higher). Further, the first evaluation unit 106 can evaluate a class attitude to be lower as an input frequency of a second category is higher (as the number of input times is higher).

The first category is a word recommended to be input in class, such as an interesting word. The second category is a word that is not recommended to be input in class, such as an NG word. For example, the first evaluation unit 106 may evaluate a class attitude of each student by five grades of A to E. The first evaluation unit 106 registers an evaluation result in a first storage unit 104.

FIG. 11 schematically illustrates one example of an evaluation result generated by the first evaluation unit 106. FIG. 11 illustrates an evaluation result of a class attitude of each student in class of science in a second term of 5-1. In FIG. 11, a class attitude of each student is evaluated for each class. FIG. 11 illustrates a date of class, an evaluation result of a class attitude of each student in class of each day, and an interesting word and an NG word being input from each student in class of each day.

A first output unit 103 can output an evaluation result of a class attitude of each student via an output terminal such as a teacher terminal 300. For example, the first output unit 103 may output the table as illustrated in FIG. 11. In addition, the first output unit 103 may generate a graph illustrating an evaluation result in time series, and output the graph.

The other configuration of the system according to the present example embodiment is similar to that in the first to third example embodiments.

The system according to the present example embodiment achieves an advantageous effect similar to that in the first to third example embodiments. Further, the system according to the present example embodiment can evaluate a class attitude of each student, based on a trend of an input word. Since an evaluation is performed based on a trend of an input word, an objective and reliable evaluation result can be acquired.

Fifth Example Embodiment

First, an outline of a processing apparatus 100 according to the present example embodiment will be described. The processing apparatus 100 acquires an operation history of each of a plurality of student terminals 200, and detects an NG operation being predefined from the operation history. Then, when the NG operation is detected, the processing apparatus 100 outputs warning information via an output terminal (for example, a teacher terminal 300).

In this way, the processing apparatus 100 according to the present example embodiment can detect a student who does not properly tackle class, based on an operation situation of the student terminal 200, and can notify a teacher.

Figure 12:
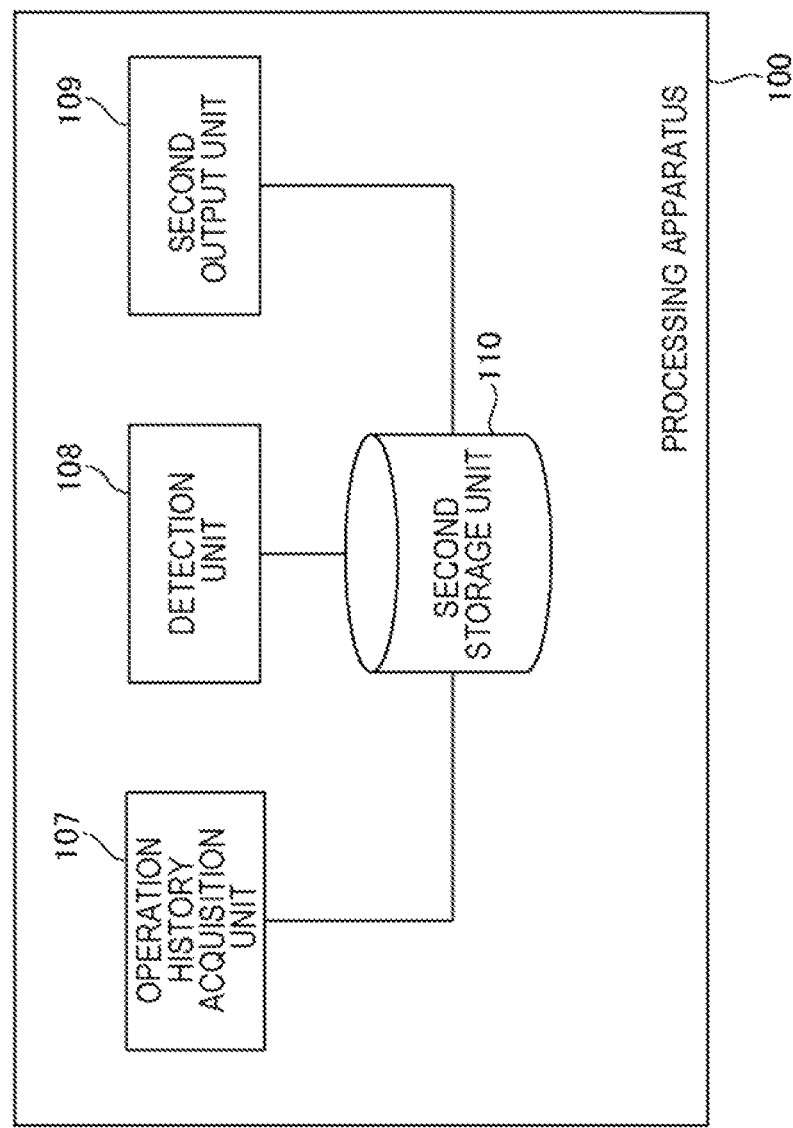
FIG. 12 is a diagram illustrating one example of a functional block diagram of the processing apparatus according to the present example embodiment.

FIG. 12 illustrates one example of a functional block diagram of the processing apparatus 100 according to the present example embodiment. As illustrated, the processing apparatus 100 includes an operation history acquisition unit 107, a detection unit 108, a second output unit 109, and a second storage unit 110. Note that, although not illustrated, the processing apparatus 100 may include an input word acquisition unit 101, a classification unit 102, a first output unit 103, and a first storage unit 104. Further, the processing apparatus 100 may further include at least one of an update unit 105 and a first evaluation unit 106.

The operation history acquisition unit 107 acquires an operation history of each of the plurality of student terminals 200. The operation history includes a used application, a used content, a log-in date and time, a log-out date and time, an input operation content (such as a content of a key input and a content of a touch operation), and the like. The student terminal 200 has a function of surveying an operation. Then, the student terminal 200 transmits an operation history being a history of a detected operation to the processing apparatus 100. The operation history acquisition unit 107 acquires an operation history transmitted from the student terminal 200 in such a manner.

The operation history acquisition unit 107 stores an acquired operation history in the second storage unit 110. An operation history is registered for each student in the second storage unit 110. For example, a student who performs an operation on each student terminal 200 can be identified based on log-in information to the student terminal 200, and the like.

The detection unit 108 detects an NG operation being predefined from an operation history. The NG operation is an operation that is not recommended to be performed in class and at school. In the present example embodiment, details of the NG operation are not limited. In the example embodiment below, a specific example of the NG operation will be described.

When the NG operation is detected, the second output unit 109 outputs warning information via an output terminal. The output terminal is, for example, the teacher terminal 300. The warning information is output via a display, a speaker, or the like of the teacher terminal 300.

Figure 13:
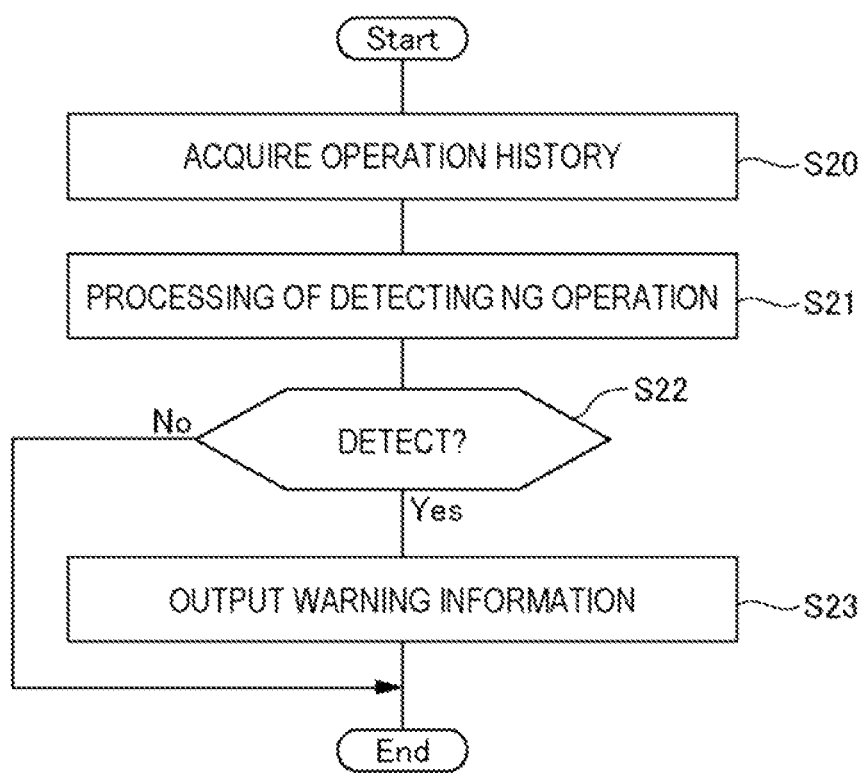
FIG. 13 is a flowchart illustrating one example of a flow of processing of the processing apparatus according to the present example embodiment.

Next, one example of a flow of processing of the processing apparatus 100 will be described by using a flowchart in FIG. 13.

When the processing apparatus 100 acquires an operation history of each of the plurality of student terminals 200 (S20), the processing apparatus 100 detects an NG operation being predefined from the operation history (S21). Then, when the NG operation is detected (Yes in S22), the processing apparatus 100 outputs warning information via an output terminal such as the teacher terminal 300, for example (S23). Note that, when the NG operation is not detected (No in S22), the processing apparatus 100 does not perform processing of outputting warning information.

The other configuration of the system according to the present example embodiment is similar to that in the first to fourth example embodiments.

The system according to the present example embodiment can detect a student who does not properly tackle class, based on an operation situation of the student terminal 200, and can notify a teacher. A teacher can recognize a tackling attitude of a student toward class, based on a notification content.

Further, when the processing apparatus 100 has a configuration similar to that in the first to fourth example embodiments, the system according to the present example embodiment achieves an advantageous effect similar to that in the first to fourth example embodiments.

Sixth Example Embodiment

In the present example embodiment, the configuration of the system according to the fifth example embodiment is further embodied.

"Embodying of NG Operation"

An NG operation according to the present example embodiment includes at least one of NG operations 1 to 3 below.

(NG Operation 1) Usage of a Content that is not Specified.

A content permitted to be used in class and at school is specified in advance. For example, a digital textbook, a digital teaching material, and the like used in class are specified as a content permitted to be used.

(NG Operation 2) Usage of an Application that is not Specified.

An application permitted to be used in class and at school is specified in advance. For example, an application used in class is specified as a content permitted to be used.

(NG Operation 3) Repetition of the Same Operation for a Reference or More.

NG operation 3 corresponds to an "operation of repeatedly pressing the same key", an "operation of repeatedly pressing only a few (for example, two to three) same keys", an "operation of repeatedly tapping the same area (for example: one of a plurality of areas acquired by dividing a touch area into N (N is an integer of two or more))", and the like. Such an operation is a meaningless operation, and indicates that a student does not concentrate on class. The reference described above is expressed by a predetermined period of time, a predetermined number of times, and the like. A specific value of the reference described above is a design matter.

Note that, an NG operation may be defined for each predetermined attribute. For example, which NG operations 1 to 3 described above is set as an NG operation may be defined for each predetermined attribute. Further, a content permitted to be used, an application permitted to be used, a content of a repetitive operation being an NG operation, and the like may be specified for each predetermined attribute. The attribute can include at least one of a teacher, a subject, a school, a region, a school year, and a school class. In this case, the detection unit 108 determines an NG operation, based on a definition that coincides with an attribute of a class in which an operation indicated in an operation history is performed. The attribute of a class in which an operation indicated in an operation history is performed is a teacher in charge of the class, a subject of the class, a school at which the class is held, a region where a school at which the class is held is located, a school class in which the class is held, a school year of a school class in which the class is held, and the like.

"Embodying of Output Timing of Warning Information"

Next, an output timing of warning information will be described.

Example 1

The operation history acquisition unit 107 acquires, during class (between a class start time and a class end time), an operation history during the class. Then, the second output unit 109 outputs warning information during the class. In a case of this example, when a student performs an NG operation, warning information indicating that the NG operation being performed is output in real time via an output terminal.

Example 2

The operation history acquisition unit 107 acquires an operation history during class (between a class start time and a class end time). The operation history acquisition unit 107 may acquire an operation history during class by real time processing during the class, or may acquire the operation history by batch processing after the class ends. In a case of this example, the second output unit 109 outputs, via an output terminal after the class, warning information collectively indicating an NG operation detected during the class in response to a request from a user (teacher), for example.

Example 3

The operation history acquisition unit 107 acquires an operation history between a starting time and an ending time. In other words, an operation history during not only class but also other time such as break time and lunch time is acquired. The operation history acquisition unit 107 may acquire an operation history between a starting time and an ending time by real time processing, or may acquire the operation history by batch processing after the ending time.

In a case of this example, warning information may be output by real time processing in response to detection of an NG operation similarly to Example 1, or warning information collectively indicating an NG operation detected on that day may be output after an ending time similarly to Example 2.

"Embodying of Warning Information"

Warning information includes a content of a detected NG operation, and information (such as a name and student identification information) indicating a student who performs the NG operation.

Further, when warning information is output by real time processing in response to detection of an NG operation, the warning information may further include an accumulated number of times of the NG operation being performed until that time by a student during class, information (such as a time and information indicating how many minutes ago) indicating a timing detected immediately before that, and the like.

Further, when warning information collectively indicating a detected NG operation is output after class or an ending time, the detected NG operation may be collectively displayed for each student, each time period, and the like. Then, the warning information may include an accumulated number of times of the NG operation performed by each student, an accumulated number of times of the NG operation performed in each time period, and the like.

The other configuration of a system according to the present example embodiment is similar to that in the fifth example embodiment.

The system according to the present example embodiment achieves an advantageous effect similar to that in the fifth example embodiment. Further, the system according to the present example embodiment can detect an NG operation such as usage of a content that is not specified, usage of an application that is not specified, and repetition of the same operation for a reference or more. A teacher can recognize a tackling attitude of a student toward class, based on a detection result of such an NG operation.

Further, the system according to the present example embodiment can detect an NG operation performed by a student in real time in class, and output the NG operation via the output terminal. Thus, a teacher can recognize a tackling attitude of a student toward class in real time in the class.

Further, the system according to the present example embodiment can collectively output, via the output terminal after class, an NG operation performed by a student during the class. Thus, a teacher can recognize a tackling attitude of a student toward class as the whole class, and evaluate a class attitude of each student, and the like.

Further, the system according to the present example embodiment can detect an NG operation performed by a student between a starting time and an ending time, and output the NG operation via the output terminal. In other words, an NG operation performed during not only class but also other time such as break time and lunch time can be detected. Thus, a teacher can evaluate not only a tackling attitude toward class, but also a living attitude at school including a way to spend break time, lunch time, and the like, and the like.

Seventh Example Embodiment

A system according to the present example embodiment is different from the fifth and sixth example embodiments in a point that the system according to the present example embodiment has a function of evaluating a class attitude of each student, based on an operation history of each student.

Figure 14:
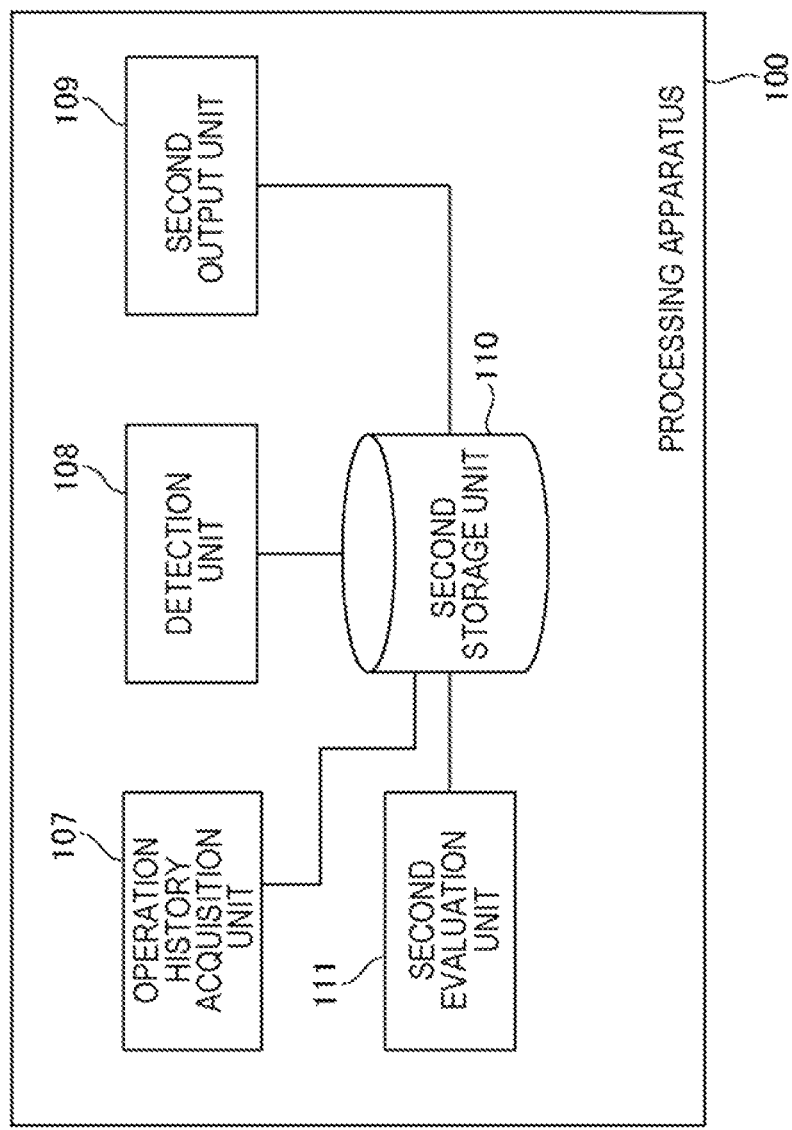
FIG. 14 is a diagram illustrating one example of a functional block diagram of the processing apparatus according to the present example embodiment.

FIG. 14 illustrates one example of a functional block diagram of a processing apparatus 100 according to the present example embodiment. As illustrated, the processing apparatus 100 is different from the fifth and sixth example embodiments in a point that the processing apparatus 100 includes a second evaluation unit 111. Note that, although not illustrated, similarly to the fifth and sixth example embodiments, the processing apparatus 100 may include an input word acquisition unit 101, a classification unit 102, a first output unit 103, and a first storage unit 104. Further, the processing apparatus 100 may further include at least one of an update unit 105 and a first evaluation unit 106.

The second evaluation unit 111 evaluates a class attitude of each student, based on an operation history of each student. The second evaluation unit 111 evaluates a class attitude to be higher as the number of times an NG operation is detected is smaller. Then, the second evaluation unit 111 evaluates a class attitude to be lower as the number of times an NG operation is detected is greater. For example, the second evaluation unit 111 may evaluate a class attitude of each student by five grades of A to E. The second evaluation unit 111 registers an evaluation result in a second storage unit 110.

FIG. 15 schematically illustrates one example of an evaluation result generated by the second evaluation unit 111. FIG. 15 illustrates an evaluation result of a class attitude of each student in class of science in a second term of 5-1. In FIG. 15, a class attitude of each student is evaluated for each class. FIG. 15 illustrates a date of class, an evaluation result of a class attitude of each student in class of each day, and an NG operation being performed by each student in class of each day.

Note that, the second evaluation unit 111 may detect a recommended model operation from an operation history of each student. As the model operation, usage of a specified content, usage of a specified application, and the like are exemplified, which are not limited thereto. Similarly to an NG operation, the model operation may be defined for each predetermined attribute.

In this case, the second evaluation unit 111 evaluates a class attitude to be higher as the number of times the model operation is detected is greater. Then, the second evaluation unit 111 evaluates a class attitude to be lower as the number of times the model operation is detected is smaller.

A second output unit 109 can output an evaluation result of a class attitude of each student via an output terminal such as a teacher terminal 300. For example, the second output unit 109 may output the table as illustrated in FIG. 15. In addition, the second output unit 109 may generate a graph illustrating an evaluation result in time series, and output the graph.

The other configuration of the system according to the present example embodiment is similar to that in the fifth and sixth example embodiments.

The system according to the present example embodiment achieves an advantageous effect similar to that in the fifth and sixth example embodiments. Further, the system according to the present example embodiment can evaluate a class attitude of each student, based on an operation history. Since an evaluation is performed based on an operation history, an objective and reliable evaluation result can be acquired.

Note that, in the present specification, "acquisition" includes at least any one of "acquisition of data stored in another apparatus or a storage medium by its own apparatus (active acquisition)", based on a user input or an instruction of a program, such as reception by making a request or an inquiry to another apparatus and reading by accessing to another apparatus or a storage medium, "inputting of data output to its own apparatus from another apparatus (passive acquisition)", based on a user input or an instruction of a program, such as reception of data to be distributed (transmitted, push-notified, or the like) and acquisition by selection from among received data or received information, and "creation of new data by editing data (such as texting, sorting of data, extraction of a part of data, and change of a file format) and the like, and acquisition of the new data".

A part or the whole of the above-described example embodiment may also be described in supplementary notes below, which is not limited thereto.

1. A processing apparatus, including:
    an input word acquisition unit that acquires an input word being a word input to each of a plurality of student terminals;
    a classification unit that classifies the input words into a plurality of categories; and
    an output unit that displays a list of at least some of the input words, and also outputs, via an output terminal, a screen indicating a result of the classification of each of the input words displayed in the list.
2. The processing apparatus according to supplementary note 1, wherein,
    when the output unit receives an input for specifying one of the input words displayed in the list, the output unit outputs, via the output terminal, information indicating a student who inputs the specified input word.
3. The processing apparatus according to supplementary note 1 or 2, wherein
    the input word acquisition unit acquires, during class, the input word being input during the class, and
    the output unit outputs the screen during the class.
4. The processing apparatus according to any of supplementary notes 1 to 3, wherein
    the input word acquisition unit acquires the input word being input during class, and
    the output unit outputs the screen after the class ends.
5. The processing apparatus according to any of supplementary notes 1 to 4, wherein
    the category includes at least one of an NG word not being recommended to be input in class, an interesting word being recommended to be input in class, a high frequency word having an input frequency equal to or more than a threshold value, and a low frequency word having an input frequency less than a threshold value.
6. The processing apparatus according to any of supplementary notes 1 to 5, wherein
    the classification unit classifies the input word into each of a plurality of categories, based on a category dictionary in which a word included in each category is registered in association with each category,
    the category dictionary is prepared for each attribute,
    the classification unit classifies the input word into the category, based on the category dictionary that coincides with an attribute of class in which the input word is input, and
    the attribute includes at least one of a teacher, a subject, a school, a region, a school year, and a school class.
7. The processing apparatus according to supplementary note 6, further including
    an update unit that updates the category dictionary, wherein,
    when the update unit receives an input for specifying one of the input words displayed in the list and an input for specifying the category of the specified input word, the update unit registers the specified input word in association with the specified category in the category dictionary.
8. The processing apparatus according to any of supplementary notes 1 to 7, further including
    an evaluation unit that evaluates a class attitude of each student, based on a result of the classification of the input word being input from each student.
9. A processing method, including,
    executed by a computer:
    an input word acquisition step of acquiring an input word being a word input to each of a plurality of student terminals;
    a classification step of classifying the input words into a plurality of categories; and
    an output step of displaying a list of at least some of the input words, and also outputting, via an output terminal, a screen indicating a result of the classification of each of the input words displayed in the list.
10. A program causing a computer to function as:
    an input word acquisition unit that acquires an input word being a word input to each of a plurality of student terminals;
    a classification unit that classifies the input words into a plurality of categories; and
    an output unit that displays a list of at least some of the input words, and also outputs, via an output terminal, a screen indicating a result of the classification of each of the input words displayed in the list.

100 Processing apparatus
101 Input word acquisition unit
102 Classification unit
103 First output unit
104 First storage unit
105 Update unit
106 First evaluation unit
107 Operation history acquisition unit
108 Detection unit
109 Second output unit
110 Second storage unit 111 Second evaluation unit
1A Processor
2A Memory
3A Input/output interface
4A Peripheral circuit
5A Bus

The invention claimed is:

1. A processing apparatus, comprising:
at least one memory configured to store one or more instructions; and
at least one processor configured to execute the one or more instructions to:
acquire an input word being a word input to each of a plurality of student terminals;
classify the input words into a plurality of categories;
display a list of at least some of the input words, and also output, via an output terminal, a screen indicating a result of the classification of each of the input words displayed in the list;
classify the input word into each of a plurality of categories, based on a category dictionary in which a word included in each category is registered in association with each category, the category dictionary being prepared for each attribute; and
classify the input word into the category, based on the category dictionary that coincides with an attribute of class in which the input word is input, the attribute including at least one of a teacher, a subject, a school, a region, a school year, and a school class.

2. The processing apparatus according to claim 1, wherein,
the processor is further configured to execute the one or more instructions to output, via the output terminal, information indicating a student who inputs for specifying one of the input words displayed in the list, when receiving the input for specifying one of the input words.

3. The processing apparatus according to claim 1, wherein the processor is further configured to execute the one or more instructions to:
acquire, during class, the input word being input during the class, and
output the screen during the class.

4. The processing apparatus according to claim 1, wherein the processor is further configured to execute the one or more instructions to:
acquire the input word being input during class, and
output the screen after the class ends.

5. The processing apparatus according to claim 1, wherein the category includes at least one of an NG word not being recommended to be input in class, an interesting word being recommended to be input in class, a high frequency word having an input frequency equal to or more than a threshold value, and a low frequency word having an input frequency less than a threshold value.

6. The processing apparatus according to claim 1, wherein the processor is further configured to execute the one or more instructions to:
update the category dictionary, and
when receiving an input for specifying one of the input words displayed in the list and an input for specifying the category of the specified input word, register the specified input word in association with the specified category in the category dictionary.

7. The processing apparatus according to claim 1, wherein the processor is further configured to execute the one or more instructions to evaluate a class attitude of each student, based on a result of the classification of the input word being input from each student.

8. A processing method, comprising,
executed by a computer:
acquiring an input word being a word input to each of a plurality of student terminals;
classifying the input words into a plurality of categories;
displaying a list of at least some of the input words, and also outputting, via an output terminal, a screen indicating a result of the classification of each of the input words displayed in the list;
classifying the input word into each of a plurality of categories, based on a category dictionary in which a word included in each category is registered in association with each category, the category dictionary being prepared for each attribute; and
classifying the input word into the category, based on the category dictionary that coincides with an attribute of class in which the input word is input, the attribute including at least one of a teacher, a subject, a school, a region, a school year, and a school class.

9. A non-transitory storage medium storing a program causing a computer to:
acquire an input word being a word input to each of a plurality of student terminals;
classify the input words into a plurality of categories;
display a list of at least some of the input words, and also output, via an output terminal, a screen indicating a result of the classification of each of the input words displayed in the list;
classify the input word into each of a plurality of categories, based on a category dictionary in which a word included in each category is registered in association with each category, the category dictionary being prepared for each attribute; and
classify the input word into the category, based on the category dictionary that coincides with an attribute of class in which the input word is input, the attribute including at least one of a teacher, a subject, a school, a region, a school year, and a school class.

* * * * *